Nov. 24, 1964
M. WIDMER
3,158,416
MOUNTING OF THE SPINDLE OF A MACHINE TOOL
Filed Sept. 4, 1962
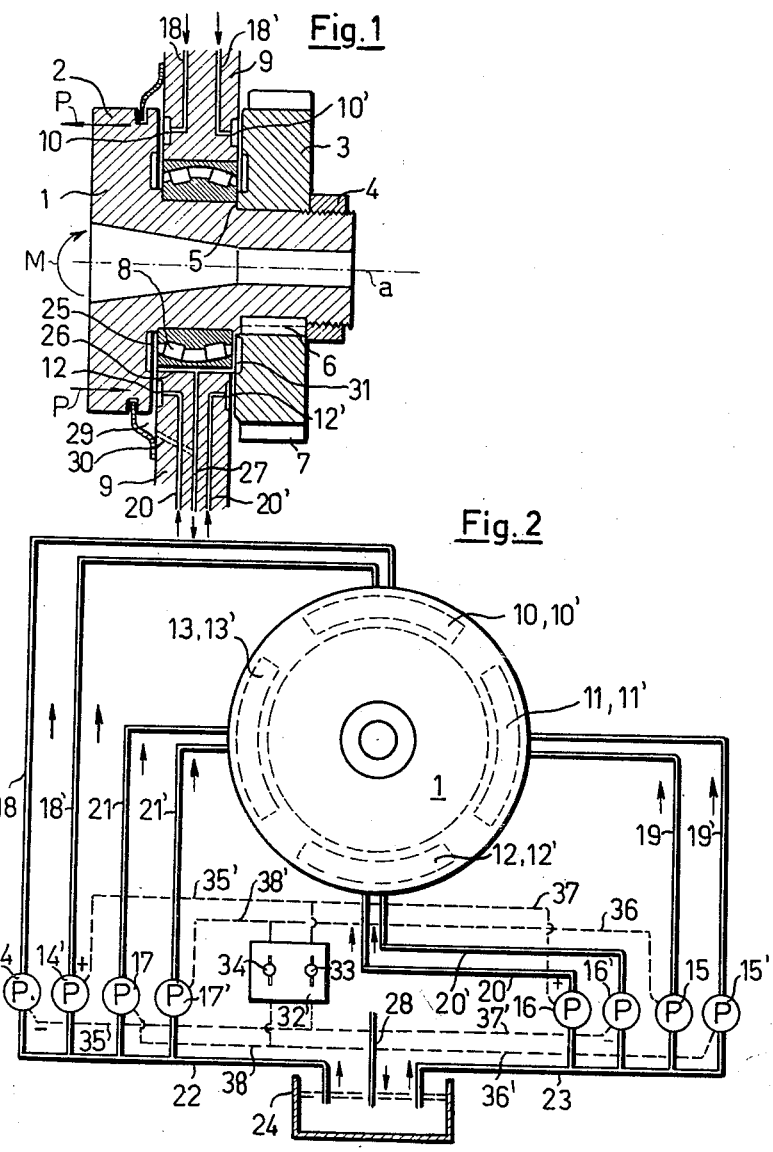
INVENTOR.
MANFRED WIDMER
BY
Dodge and Sons
ATTORNEYS

3,158,416
MOUNTING OF THE SPINDLE OF A MACHINE TOOL
Manfred Widmer, Zurich, Switzerland, assignor to Escher Wyss Aktiengesellschaft, Zurich, Switzerland, a corporation of Switzerland
Filed Sept. 4, 1962, Ser. No. 221,004
Claims priority, application Switzerland, Sept. 15, 1961, 10,731, 10,732
8 Claims. (Cl. 308—168)

This invention relates to a mounting of the spindle of a machine tool.

It is often required of the mounting of the spindle of a machine tool, for example a milling machine, that it should take up considerable torques rotating about an axis perpendicular to the spindle axis. For taking up such a torque hitherto two radial bearings have been provided at an axial distance apart, while the axial forces have been taken up by an axial bearing. Such a mounting, however, has the disadvantage of a considerable overall length in the axial direction. It is then impossible, for example, to machine workpieces in which there is only a little free space between the surface to be machined and the adjacent parts.

In a mounting of the spindle of a machine tool this disadvantage is obviated according to the invention in that in addition to a single radial bearing, two oppositely acting axial bearings are provided for taking up torques which rotate about an axis perpendicular to the spindle axis.

A constructional example of the subject of the invention is represented in the drawing.

FIG. 1 shows an axial longitudinal section through the mounting, and

FIG. 2 a view in the axial direction with a circuit for lubricant supply.

A milling machine spindle 1 has a flange 2 on the end on which the milling cutter is mounted. On the opposite end is a disc 3 of substantially the same diameter as the flange 2. This disc 3 is pressed by a nut 4 against a stop 5. The disc 3 is secured from rotation relative to the spindle 1 by a key 6 and carries on its outer periphery a toothed rim 7, whereby the spindle 1 is driven by means not shown.

In the radial direction, the spindle 1 is supported by a self-adjusting roller bearing 8 inserted between the collar of the spindle 1 formed by the flange 2 and the disc 3. The stationary part of this roller bearing 8 is inserted in a bearing body 9. The axially opposed faces of this bearing member form two oppositely acting axial bearings which co-operate with the adjacent faces of the flange 2 and disc 3 and are arranged axially on either side of the radial bearing, i.e. the roller bearing 8.

The axial bearings are constructed as hydrostatic bearings, there being provided, on either side of the bearing body 9, four depressions 10, 11, 12, 13 and 10', 11', 12', 13' respectively, in the faces turned toward the flange 2 and the disc 3, said depressions being provided with lubricant under pressure and forming liquid cushions. The depressions 10, 11, 12, 13 each extend over a sector subtending an angle of somewhat less than 90° of the annular surface formed by the flange 2, and the liquid cushions form bearing surfaces situated in the plane of the adjacent annular surface of the flange 2, the normals to these bearing surfaces extending at a mutual distance apart. The same applies to the liquid cushions formed by the depressions 10', 11', 12', 13', the bearing surfaces of which are situated in the plane of the adjacent annular face of the disc 2.

Pumps 14, 15, 16, 17 and 14', 15', 16', 17', respectively, are provided for supplying the individual liquid cushions with lubricant under pressure. The pumps 14, 15, 16, 17 are connected individually by pipes 18, 19, 20, 21 to the liquid cushions 10, 11, 12, 13 and the pumps 14', 15', 16', 17' are connected individually by pipes 18', 19', 20', 21' to the liquid cushions 10', 11', 12', 13'. The pumps draw the oil through pipes 22 and 23 from a lubricant tank 24.

The pumped lubricant flows from the individual liquid cushions 10, 11, 12, 13 partly through the lubricant gap between bearing body 9 and flange 2 into an annular depression 25 provided in the flange 2 and thence via a transverse duct 26 of the bearing body 9 and a descending duct 27 in the centre of the bearing body 9, with the connected pipe 28 (FIG. 2) back to the lubricant tank 24. The portion of the lubricant flowing radially outward through the lubricating gap between bearing body 9 and flange 2 is collected in an annular trough 29 and, via a duct 30, also flows into the duct 27 and thence via the pipe 28 into the tank 24. The lubricant pumped into the liquid cushions 10', 11', 12', 13' passes thence partly via the lubricating gap between the bearing body 9 and disc 3 into an annular depression 31 provided in the disc 3 and thence via the ducts 26 and 27 and the pipe 28 into the tank 24. The remaining part of the lubricant, flowing radially outward, is combined with the lubricant of the gearwheel drive and together with the latter lubricant is returned to the tank 24 by means not shown.

If all the liquid cushions are supplied with the same quantity of lubricant, a uniform clearance is adjusted along the periphery of the flange 2 and disc 3 between the bearing body and these two parts 2 and 3, which clearance is only varied insignificantly, depending on the initial pressure, even if a bending moment acts on the spindle.

The two axial bearings with the liquid cushions 10, 11, 12, 13 and 10', 11', 12', 13', respectively, are capable of receiving a torque rotating about an axis "$a$" perpendicular to the axis of spindle 1. If for example a torque M rotating in the clockwise direction in the plane of the drawing acts on the spindle, the lubricating gap at the upper liquid cushion 10 and at the lower liquid cushion 12' becomes narrower while the lubricating gap at the lower liquid cushion 12 and upper liquid cushion 10' becomes wider. The lubricant pressure is therefore increased at the top at 10 and at the bottom at 12', but falls at the bottom at 12 and at the top at 10'. Reactions are set up at the bearing faces of the two axial bearings forming a couple P and capable of taking up the torque M.

In the embodiment of the subject of the invention described, the known advantages of a hydrostatic mounting are also utilised in the case of the axial bearings. Without departing from the idea of the invention, however, axial bearings of another type may be used, for example hydrodynamic plain bearings or antifriction bearings. For the radial bearing also a hydrodynamic or hydrostatic plain bearing may be used instead of the antifriction bearing. Adjustability of the inclination is advantageous, but not absolutely necessary, especially if the radial bearing is comparatively narrow and the axial bearings permit only a slight variation in inclination of the spindle.

In machine tool spindles, however, it is often desirable to be able to vary the inclination of the spindle axis to a very slight extent. This is more particularly the case in milling machines or grinding machines, when flat surfaces are to be machined. If, in fact, the working surface of the milling cutter of a milling machine lies exactly in the plane of the surface to be machined, there is a danger that in the movement of the milling cutter relative to the workpiece, the rear side of the milling cutter will leave traces on the machined surface. It is therefore usual to adjust the milling cutter relative to the machined surface with a so-called "fall," i.e. the working surface of the milling cutter is adjusted in relation to the machined surface to a definite inclination, amounting to only a fraction of a degree, so that in regard to the direction of travel of the cutter relative to the work-piece, the milling cutter at the rear side is spaced by a slight amount from the machined surface, and therefore it cannot leave any machining traces on the surface of the work-piece. This adjustment of the "fall" demands extremely exact adherence to a definite angle of the spindle.

With the illustrated embodiment this purpose can be achieved in a simple manner by unequally varying the bearing clearances by individual variation of the flow of lubricant through the various liquid cushions of the hydrostatic bearing. For this purpose, means are provided for varying the inclination of the spindle axis in the bearing by influencing the flow of lubricant through these liquid cushions. These means consist in an apparatus 32 having manually operable levers 33, 34, whereby the speed of the pumps 14, 15, 16, 17 and 14', 15', 16', 17', respectively, can be influenced by means for example of electrical or hydraulic control conduits 35, 36, 37, 38 and 35', 36', 37', 38'.

The arrangement is such that, for example, if the adjusting lever 33 is moved upwardly in the drawing, the pump 14' has its speed increased and the pump 16' has its speed reduced. The lubricating gap in the case of the liquid cushion 10' is thereby increased, while it is reduced in the case of the liquid cushion 12'. Since the liquid cushions 10', 12', are diametrically opposite each other, the normals to the bearing surfaces of this pair of liquid cushions extend at a mutual distance apart. The increase in the lubricant gap in the case of the liquid cushion 10' and the decrease in the lubricant gap in the case of the liquid cushion 12' thus produce an obliquity of the disc 3 and hence a variation in inclination of the spindle 1. In the case of unaltered flow of lubricant, however, this variation in inclination would be impeded by the stabilising effect of the liquid cushions 10 and 12. In order to obtain the full effect in regard to the variation in inclination of the spindle, therefore, in the arrangement shown, the control conduits 35 and 37 leading to the pumps 14 and 16 are so connected that in the above-mentioned adjustment of the 33, they reduce the speed of pump 14 and increase the speed of pump 16. There is thus also produced a reduction in the lubricating gap in the case of the liquid cushion 10, and an increase in the lubricating gap in the case of the liquid cushion 12.

The liquid cushions 10 and 12 are a pair of liquid cushions arranged at different points on the bearing periphery and having in the axial direction of the spindle bearing surfaces acting in the same direction. The means influencing the flow of lubricant through these liquid cushions here permit variation of the lubricant film thickness in the opposite sense in the case of the two liquid cushions 10 and 12.

If, on the other hand, the two liquid cushions 10 and 12' are considered, these are a pair of liquid cushions arranged at different points on the bearing periphery and having bearing surfaces acting in opposite directions in the axial direction of the spindle. The means influencing the flow of lubricant through these two liquid cushions 10 and 12' here permit the lubricant film in the liquid cushions to be varied in the same sense. The variation in inclination of the spindle is therefore produced by the fact that the lubricant film thickness of the two liquid cushions 10 and 12', is, for example, either decreased or increased.

In the variation of lubricant flow through the liquid cushions 10, 12, and 10', 12', as described above, a variation in spindle inclination in the vertical direction is produced. The lubricant flow through the liquid cushions 11, 13 and 11', 13' is in this case unaffected. Instead of the lever 33, however, the lever 34 of the apparatus 32 may be operated, the lubricant flow through the liquid cushions 11, 13 and 11', 13' being then varied in a manner similar to that described for the liquid cushions 10, 12 and 10', 12'. In this case, a variation in spindle inclination in the horizontal direction is produced. By the simultaneous operation of both levers 33 and 34, a variation in spindle inclination in any desired direction can be produced.

In the illustrated mounting, two axial bearings, each having four peripherally distributed liquid cushions, are provided on either side of the self-adjusting radial bearing 8, the means influencing the flow of lubricant through these liquid cushions serving to vary the ratio of the quantities of lubricant flowing through the four liquid cushions of each axial bearing. These means are operatively connected together in such a manner that they vary in the opposite sense the quantities of lubricant of axially opposite liquid cushions of the two axial bearings.

Instead of four liquid cushions, a larger number of liquid cushions may be provided. To be able to effect adjustment of the spindle in any direction, at least three liquid cushions, however, are necessary, so that by individual variation of the lubricant flow through these liquid cushions at three points on the periphery, the lubricant film thickness can be maintained at a predetermined value.

The pumps 14, 15, 16, 17 and 14', 15', 16', 17' are advantageously pumps of displacement type, for example gear pumps or piston pumps, in which the delivery is practically independent of the back pressure and is dependent only on the speed. It is also possible to use control pumps of known type, in which the delivery can be varied by varying the stroke of the pump piston at constant speed of rotation. The control conduits leaving the apparatus 32 would then have to produce the corresponding variations in stroke of the individual pumps.

Instead of providing each liquid cushion with its own pump, the individual liquid cushions may be supplied with lubricant from a common pressure source by way of throttling members. In this case, for the individual variation of the lubricant quantities supplied to the various liquid cushions, the control conduits would have to act on the throttling points for suitably varying the passage cross-section. Instead of the control conduits, mechanical adjusting means may also be considered, possibly direct manual adjustment by means of a quantity distributor.

For maintaining continuously a predetermined position of the spindle axis, a regulating device responding to variation in the direction of the spindle axis may be provided, which device regulates the inclination of the spindle axis to a predetermined value in magnitude and direction by influencing the quantity of lubricant passing through the liquid cushions.

What is claimed is:

1. Mounting of the spindle of a machine tool comprising a spindle formed with a small diameter portion between two large diameter portions; a fixed support arranged between the large diameter portions; a single self-adjusting radial bearing arranged between the support and the small diameter portion; an axial bearing arranged between the support and each large diameter portion; said axial bearings being provided with at least one pair of peripherally spaced liquid cushions; and means for individually varying the liquid supply to said cushions so as to vary the angular position of the spindle axis.

2. The mounting defined in claim 1 in which at least one of said axial bearings comprises a pair of peripherally spaced liquid cushions and means are provided for varying the liquid supply to said cushions in the opposite sense.

3. The mounting defined in claim 1 in which said axial bearings comprise at least one pair of peripherally spaced liquid cushions arranged to act oppositely upon the spindle and means are provided for varying the liquid supply to said cushions in the same sense.

4. The mounting defined in claim 1 in which each of said axial bearings comprises at least three peripherally spaced liquid cushions supplied with pressure liquid, and means are provided for varying the ratio of the quantities of liquid flowing through the liquid cushions of at least one of said axial bearings.

5. The mounting defined in claim 1 in which the said axial bearings comprise axially opposite liquid cushions, and means influencing the flow of liquid through said cushions, said means being operatively connected together in such a manner that they vary the quantities of lubricant of the axially opposite liquid cushions in the opposite sense.

6. The mounting defined in claim 1 in which each of said axial bearings has four liquid cushions distributed over the periphery, individual means being provided for varying the flow of liquid through said cushions, said means being operaitvely connected together in such a manner that they vary in opposite sense the quantities of liquid of diametrically opposite cushions of the same axial bearing.

7. In combination a rotatable spindle for a machine tool consisting of two axially spaced discs and a portion of smaller diameter between said discs, one disc being formed to receive cutter means and the other being formed as a driving means; a fixed annular supporting body arranged between said discs and having opposite faces forming axial bearing surfaces for said discs; a radial bearing arranged between said annular supporting body and said portion of smaller diameter; a plurality of circumferentially distributed depressions formed in said opposite faces; and independently variable lubricant supply means supplying lubricant to each of said depressions, the lubricant in said depressions forming pressure cushions for said discs.

8. The combination defined in claim 7 in which the radial bearing is adjustable in inclination.

References Cited by the Examiner
UNITED STATES PATENTS 1,607,318 11/26 Spillmann _____ 308—170
1,906,715 5/33 Penick _____ 308—9

FRANK SUSKO, *Primary Examiner.*
ROBERT C. RIORDON, *Examiner.*